United States Patent [19]

Theuveny

[11] Patent Number: 5,087,400
[45] Date of Patent: Feb. 11, 1992

[54] PROCESS FOR MAKING A PRODUCT SERVING AS A CULTIVATION SUPPORT

[75] Inventor: Christian Theuveny, Chambourcy, France

[73] Assignee: Wogegal S.A., France

[21] Appl. No.: 415,257

[22] PCT Filed: Jan. 11, 1989

[86] PCT No.: PCT/FR89/00004
§ 371 Date: Oct. 31, 1989
§ 102(e) Date: Oct. 31, 1989

[87] PCT Pub. No.: WO89/06488
PCT Pub. Date: Jul. 27, 1989

[30] Foreign Application Priority Data

Jan. 13, 1988 [FR] France .................... 88 00325

[51] Int. Cl.$^5$ .................... A01G 9/10; D04H 1/58
[52] U.S. Cl. .................... 264/115; 47/64; 241/28; 264/40.1; 264/40.6; 264/109; 264/118
[58] Field of Search .................... 264/109, 115, 118, 121, 264/40.1, 40.6; 241/28; 47/64

[56] References Cited

U.S. PATENT DOCUMENTS

| | | | |
|---|---|---|---|
| 2,757,115 | 7/1956 | Heritage | 264/115 |
| 3,533,563 | 10/1970 | Eriksson | 241/28 |
| 3,903,229 | 9/1975 | Mark | 264/115 |
| 4,088,528 | 5/1978 | Berger et al. | 162/19 |
| 4,218,414 | 8/1980 | Hagg et al. | 264/40.4 |
| 4,402,896 | 9/1983 | Betzner et al. | 264/115 |
| 4,605,401 | 8/1986 | Chmelir et al. | 604/368 |
| 4,950,444 | 8/1990 | Deboufie et al. | 264/37 |

*Primary Examiner*—Mary Lynn Theisen
*Attorney, Agent, or Firm*—Bacon & Thomas

[57] ABSTRACT

Process and installation for making a composite product, obtained by removing the fibre from wood chippings or other cellulose raw material, especially for above-ground cultivation purposes. The chippings (3) are place in a two-screw (2) fibre-removing machine (1), the overall characteristics being adjusted in such a way as to obtain, at the outlet of the machine (1), a mixture (31) based on isolated fibres and agglomerated bunches of fibres, of varying lengths and grain dimensions. An adhesive binder is inserted at a set feed-rate in the sleeve (11) during fibre removal so that it spreads through the fibre mixture in a discontinuous manner. By controlling the temperature the hardening of the binder can be delayed until the product emerges from the machine (1). Also covered is the product obtained in the form of a rigid block inserted in a sealed jacket.

14 Claims, 2 Drawing Sheets

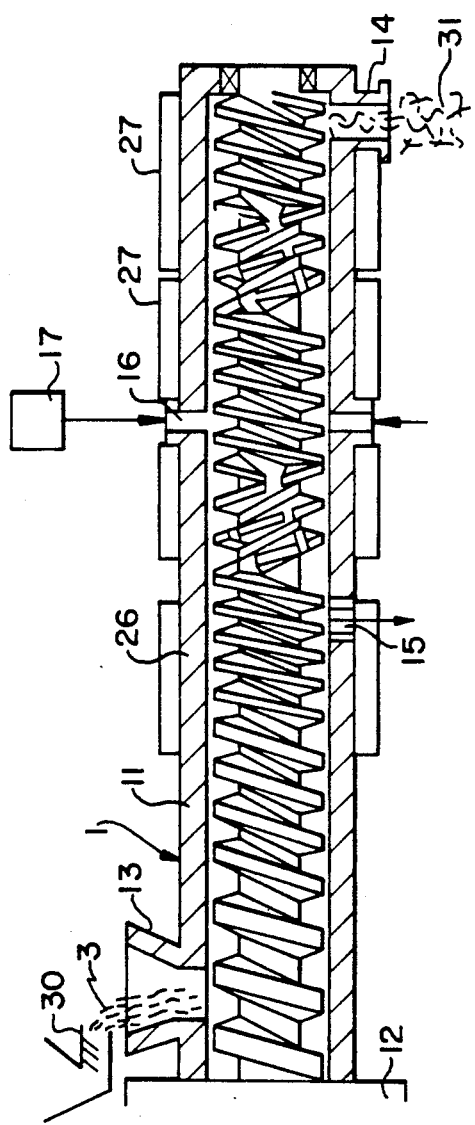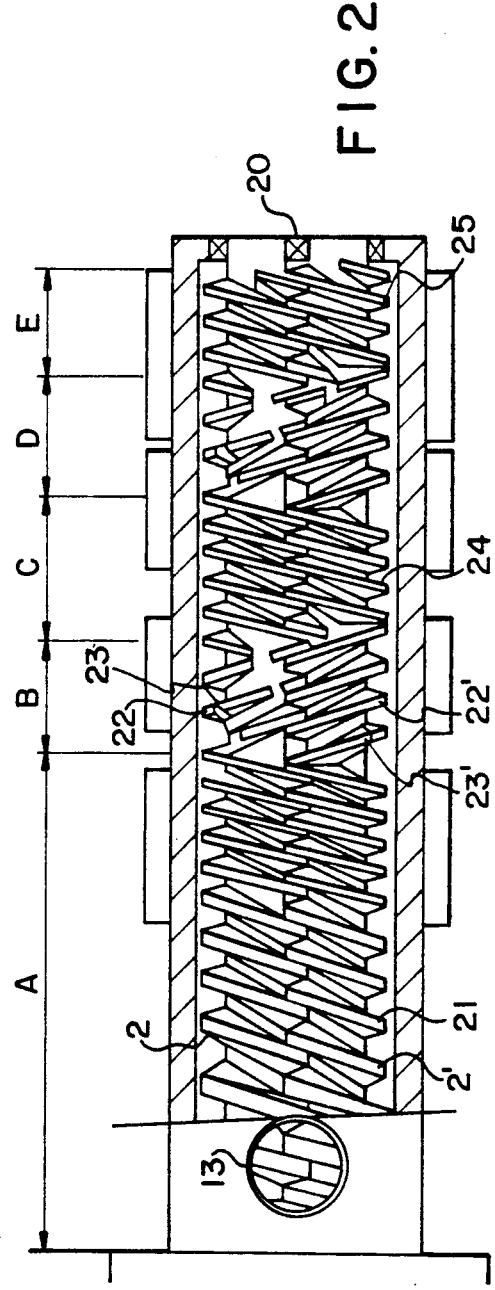

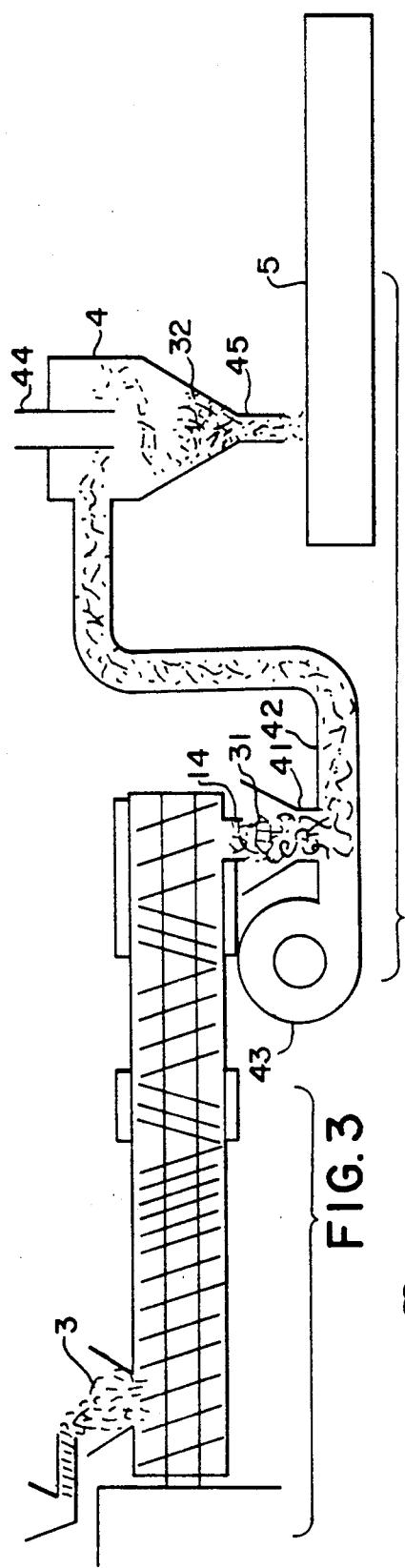
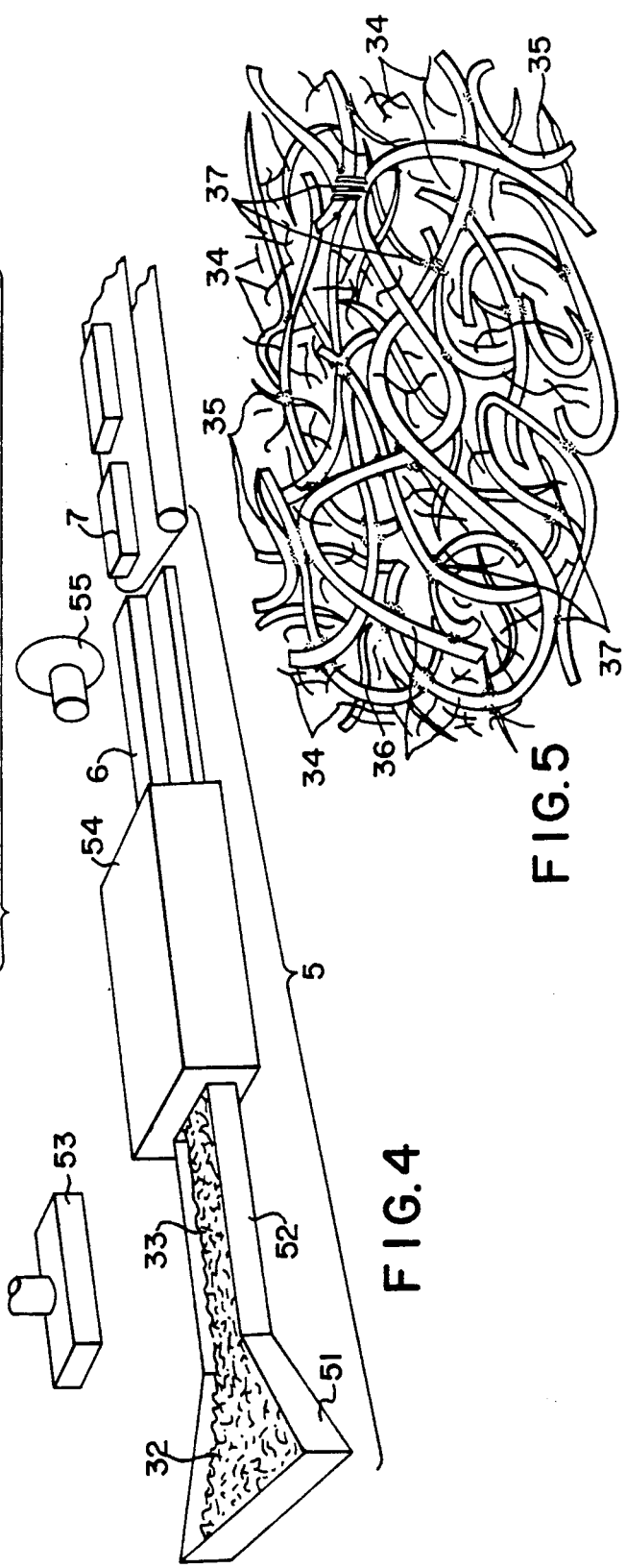
FIG.3
FIG.4
FIG.5

PROCESS FOR MAKING A PRODUCT SERVING AS A CULTIVATION SUPPORT

The invention relates to a process and a plant for making a product consisting of a mixture of entangled fibers and capable of constituting, in particular, a support which can be employed for cultivation out of soil.

The invention also covers the cultivation support produced according to the process.

It has now become quite common to practice, in some conditions, "out-of-soil" cultivation, that is to say on a support produced for this purpose and not on a natural terrain. Such supports can be made of various substances, organic or otherwise, such as plastics, sand, expanded clay, compost, sawdust, chips and the like.

In general, an out-of-soil cultivation support must exhibit a certain number of physical, chemical and biological properties. In fact, the support must, on the one hand, support the roots and, on the other hand, permit the circulation of air, water and fertilizer. In addition, it must preferably be nonputrescible, at least for a certain time, and made up of organic or other products, it must not exhibit phytotoxicity and must not promote the development of microorganisms which are harmful to plants. For various reasons, especially a relatively low cost, it is advantageous to make such a product from wood scraps or other lignocellulosic raw material.

In particular, it has already been proposed to employ as a support for out-of-soil cultivation a product consisting of wood fibers obtained by grinding wood. This operation is performed by the so-called "thermomechanical" method, commonly employed for the manufacture of papermaking pulp, and in which the shavings are subjected to a cooking process with steam and then pass into a disc grinder in the presence of steam under pressure.

A mixture is thus obtained, in which the proportion of water is very high and which must be pressed and dried when the site of use is far from the production site, to avoid the transport being too costly.

The use of machines which are already known for the manufacture of papermaking pulp is advantageous because such machines exist in the trade and their operation and control are well known. However, the properties required in a cellulose fiber pulp for the manufacture of papermaking pulp are not necessarily those expected from a product intended for the manufacture of a cultivation support.

The subject of the invention is, in contradistinction, a new process and a plant making it possible to perform the grinding of wood chips in conditions which are specially adapted to obtaining a product exhibiting a set of qualities which are particularly advantageous for the production of an out-of-soil cultivation support.

The invention also relates to the new product thus made.

In accordance with the invention, the grinding of the wood chips is carried out by passing them through a machine comprising at least two screws driven in rotation inside a barrel which encloses them and provided with flights of various pitches and in which all the characteristics are regulated so as to produce a controlled degree of grinding making it possible to obtain, at the outlet of the machine, a mixture based on isolated fibers and agglomerated bundles of fibers, of various lengths and particle sizes and, during the grinding, an adhesive binder is introduced into the barrel at a rate regulated as a function of the conveying conditions of the entrained material so that it may be distributed noncontinuously in the mixture of fibers, the temperature of the entrained material being controlled so as to delay the curing of the adhesive binder so that the latter does not take place within the barrel.

Advantageously, the grinding conditions are regulated so as to obtain a mixture of fibers whose lengths can range from a few microns to approximately one centimeter. In addition, the particle size distribution of the mixture is preferably such that at least sixty per cent (60%) of the mixture is retained on a 14 screen and that the proportion of fines passing through the 200 screen is less than ten per cent (10%).

The invention is based on the idea that instead of performing the grinding in the manner employed commonly for the manufacture of papermaking paste, that is to say in disc refiners or mills, it would be more advantageous, in order to obtain the required special properties, to employ another, less well-known process, proposed quite recently, in which the grinding of the chips is produced by passing through a screw machine of the same type as those employed for the production and the extrusion of plastics.

A machine of this kind, described in particular in French Patent 2,319,737, comprises at least two screws with parallel axes, driven in rotation within a barrel and provided with helical flights which intermesh so as to entrain the chips between an upstream end and a downstream end of the barrel, where an orifice for introducing the chips and an orifice for discharging the ground material are arranged, respectively, the screws consisting of successive adjoining zones provided with flights of various pitches.

To produce the mixture of fibers exhibiting the required properties, the screws comprise, in the direction of progress of the material, a first zone of entrainment in the downstream direction with progressive compression and removal of at least a part of the water present in the chips through filtering parts arranged in the barrel, a first hold-up zone comprising reverse-pitch flights of equipped with ports for passing in the downstream direction a controlled quantity of material, a second zone for entraining and mixing the material with the adhesive introduced through at least one orifice arranged in the barrel, a second reverse-pitch hold-up zone with ports, and a third zone for entraining the mixture towards the discharge orifice of the barrel.

The ports of the flights with reverse pitch preferably have a width of the order of 15 to 20 millimeters in the first hold-up zone and 12 to 15 millimeters in the second hold-up zone.

Furthermore, the machine is advantageously equipped with means for regulating the temperature of the entrained material which enable the latter to be regulated at a level above 100° C., preferably between 120° and 140° C., in the first entrainment zone, the temperature of the material being subsequently decreased to a level below 100° C. before the introduction of the adhesive binder and maintained at this level as far as the outlet of the machine, so as avoid curing the binder, which is normally produced by polymerization.

The ground material thus produced could be employed as such. However, according to another particularly advantageous characteristic, the plant comprises, after the outlet of the grinding machine, means for distributing and shaping the fiber mixture into the form of a rigid block of specified dimensions.

Means for rapidly cooling and partially drying the mixture are preferably inserted between the grinding machine and the shaping means. These cooling and drying means may advantageously consist of a conveying duct carrying a stream of gas, equipped at its upstream end with an orifice for introducing the mixture as it leaves the ground machine and opening at its downstream end into a cyclone comprising a stack for discharging the moisture-laden gas and a lower orifice for discharging the cooled and dried mixture.

In a preferred embodiment, the means for distributing and shaping the mixture comprise a vibrating table fed continuously with the grinding mixture for packing the latter, followed by a shaping table equipped with means for shaping the mixture into the form of a continuous bar of specified width and thickness. The shaping table is additionally followed by a zone for drying and polymerizing the adhesive by heating the bar to a temperature of the order of 130° C. The continuous bar thus produced can then be cut into lengths of specified dimensions.

A wood fiber-based cultivation support is thus produced, consisting of a mixture of entangled fibers of broad particle size distribution, joined together by points of glue distributed randomly and noncontinuously, the assembly forming, after drying, an aerated and relatively rigid structure. Furthermore, the mixture may be converted into solid .beam lengths whose section and length are determined depending on the use and the marketing conditions. Each length is advantageously placed in a synthetic film capable of retaining the liquids and allowing air to pass through.

However, the invention will be understood better from the following description of a particular embodiment given by way of example and illustrated by the attached drawings.

FIG. 1 is a view of the grinding machine in lengthwise section.

FIG. 2 is a top view of the machine, with partial cutaway of the barrel.

FIG. 3 is a diagrammatic general view of the plant for manufacturing the product.

FIG. 4 is a diagrammatic perspective view of the means for shaping the product.

FIG. 5 shows diagrammatically a mixture of entangled fibers, on an enlarged scale.

FIG. 1 shows a screw grinding machine (1) adapted for implementing the process. The machine essentially comprises two screws (2) and (2') with parallel axes and provided with intermeshing helical flights, the interaxial distance of the screws being smaller than the external diameter of the flights. The two screws are placed inside a barrel (11) whose internal wall consists of two intersecting cylindrical faces, with the same interaxial distance as the screws, in order to enclose the latter.

The two screws are driven in rotation around their respective axes by a drive unit (12). This rotation and intermeshing of the screws results in an entrainment action (from the left towards the right in the figure) on the material introduced through a feed orifice (13) arranged at an upstream end of the barrel. This orifice (13) centered in the median plane of symmetry of the machine, opens widely over both screws and can advantageously have a diameter of the order of the interaxial distance of the screws.

The material which is thus entrained in the downstream direction is discharged through an orifice (14) placed at the other end of the barrel. No extrusion effect is sought in this application and, consequently, the orifice (14) can merely open downwards. Because of this, the shafts carrying the two screws are mounted so that they rotate in bearings placed at both ends of the barrel.

As indicated, machines incorporating screws offer a certain number of particular advantages, which are put to use in implementing the invention.

First of all, it is known, in machines of this kind, to produce the screw flights in the form of adjoining lengths fitted one after the other on the shafts, the latter being splined so that they are firmly joined to the flights in rotation. In addition, both screws can be withdrawn from the barrel quite simply, for example by sliding or by producing an opening barrel. As a result, the lengths, the pitches and the number of flights of the different adjoining lengths can be changed to modify the screw assemblies, depending on the required result Furthermore, since the travel time of the material between the upstream end and the downstream end is very fast, the result of a flight assembly and of a change in the other process parameters, rate of rotation of the screws, temperature settings, material and water feed rates, and the like, are known almost immediately. Thus, by monitoring the result of the changes introduced on each occasion, the various characteristics of the process of treatment of the chips can be adjusted, the required result being obtained in an approximately uniform manner if the raw material introduced into the machine retains substantially the same characteristics.

Thus, it has been possible to develop a screw assembly which is specially adapted to making use of the process according to the invention.

As shown in the figure, each screw essentially comprises, from its upstream end to its downstream end in the direction of progress of the material, a first zone of entrainment in the downstream direction and of progressive compression A, a first hold-up zone B, a second zone of entrainment in the downstream direction C, a second hold-up zone D and a third zone of entrainment in the downstream direction E, in which discharge of the product takes place.

The first zone A, which can extend over a considerable part, of the order of one half, of the barrel (11) may also consist of adjoining lengths of different pitches and normally comprises a first section of fairly wide pitch which allows the raw material introduced through the feed orifice (13) to be quickly entrained in the downstream direction. This raw material will normally consist of moistened or stoved wood chips, but other lignocellulosic materials could also be employed if appropriate. The feed rate can be controlled, for example, by a screw metering feeder (30) distributing the chips (3) in a shower so that they are distributed well over the flights passing below the orifice (13).

After this first feed section, the pitch of the flights (21) of zone A becomes closer so as to produce a progressive compression of the entrained material.

This compression results essentially from the hold-up produced in the first hold-up zone B which comprises flights (22) of reverse pitch, which means that, bearing in mind the direction of rotation of the screws, they should make the material move back towards the orifice (13). Furthermore, these flights (22) are provided with many ports (23) distributed uniformly around the axes. For example, four or five ports can be encountered over one complete revolution.

Since both screws (2) and (2') are driven in rotation in the same direction, with the flights moving in opposite directions in the meshing zone (20) while scraping each other, and both screws (2) and (2') are locked so that, at regular intervals, two ports (23) (23') arranged in the flights (22) (22') of the two screws (2) and (2') respectively cross simultaneously in the meshing zone (20). This results at regular intervals in the opening and closing of an orifice passing through the flights (22) (22') in the lengthwise direction.

This first hold-up zone B is followed by a second entrainment zone C with a direct pitch. In this region, the barrel (11) is equipped with one or more orifices (16) opening at the beginning of zone C and connected to a circuit (17) for injecting an adhesive which can be cured by polymerization.

Zone C is followed by a second hold-up zone D made up similarly to the first zone B. Normally, each hold-up zone comprises three reverse-pitch flights provided with ports, but the latter are, however, a little narrower in the second zone D than in the first zone B. For example, in the first hold-up zone B, the ports (23) will have a width of the order of 15 to 20 millimeters and preferably 18 millimeters, and in the second hold-up zone D they will have a width of 12 to 15 millimeters, and preferably 14 millimeters. These dimensions will generally be chosen according to the degree of grinding required.

Finally, downstream of the second hold-up zone D, the screws have a third zone E for entrainment in the downstream direction and are provided with flights (25) of a relatively wide direct pitch, so as to produce a certain decompression of the entrained material, which leaves the barrel by falling through the orifice (14) which opens across both screws.

According to another characteristic which is known in a screw machine of this type, it is possible to obtain a quite accurate control of the temperature of the material in each zone using the barrel. In fact, the material entrained in the downstream direction by the rotation of the screws is distributed in a relatively thin layer all around the latter, in contact with the inner face of the barrel, in particular when the screws are driven in rotation in the same direction, and it is therefore possible, by externally surrounding the barrel (11) with heating (26) or cooling jackets (27), to keep the temperature virtually continuously at a specified level depending on the zone, it being possible, for example, to monitor the temperature using probes.

The grinding process employed in this machine is similar to that already seen in screw machines employed for the manufacture of papermaking pulp.

The chips introduced through the orifice (13) are distributed in the flights and are entrained in the downstream direction, in multiscrew machines this entrainment being produced even when the flights are not completely filled.

After the first entrainment zone of wide pitch which makes it possible to travel past the boundaries of the orifice (13), the material is compressed in the flights, especially upstream of each meshing zone and the pressure increases to a level needed to travel past the reverse-pitch hold-up zone B. In this zone B the material completely fills the flights and therefore moves back along the latter, while rotating around the axes of both screws and passing from one screw to the other in the middle meshing zone (20). Furthermore, a certain flow of material passes directly in the downstream direction by passing through the ports (23) each time the latter highest.

Owing to the combination of compression, torsion and shearing effects, this results in a fractionation of the chips with a grinding action which is particularly intense in the case of the material passing through the ports. At the exit of each reverse-pitch zone, therefore, a mixture of fibers which are already isolated and of chips which are merely fractionated is obtained.

In a screw machine, the grinding is therefore obtained by actions which differ from those employed in other mechanical processes such as mills or disc grinders which rotate at a high speed, and this results in a difference in the constitution and the consistency of the material obtained. In particular, as a result of the fact that, in screw machines, grinding is produced essentially by crushing and torsion and that the effects obtained in the compression zones, in the reverse-pitch zones and in the ports are not the same, the material leaving each reverse-pitch zone consists of a mixture of merely fractionated chips, of agglomerated bundles and of more or less isolated fibers whose dimensions and proportions depend on the various parameters controlling the transport of the material, especially the number and the width of the ports.

In the manufacture of papermaking pulp, it is desirable to obtain a fairly homogeneous mixture of fibers which are as isolated as possible, and even to produce a fibrillation effect which promotes intercoincide looping of the fibers. This is why the screw machines employed for the manufacture of papermaking pulp normally incorporate three successive reverse-pitch hold-up zones provided with ports whose lengths decrease from one zone to the next.

However, the objective of the present invention is the preparation of a product having properties other than those of papermaking pulp and it has been found that it was particularly advantageous to make use of the method of fractionation and grinding of the wood produced in a screw machine in order to obtain the desired consistency and texture without striving to perform a complete grinding of the wood chips.

Thus, by preferably limiting the number of reverse-pitch hold-up zones B and D to two, and by judiciously choosing the various parameters which control the grinding (diameter, pitch and depth of the flights, number and width of the ports, speed of rotation of the screws, and the like) it is possible to obtain at the outlet of the machine an incompletely ground material consisting of a mixture of fibers which are more or less isolated or agglomerated into bundles and which consequently have a fairly broad particle size distribution and various fiber lengths. It is a mixture of this kind that, for simplicity, will be called "fibers" in what follows. This characteristic is of great importance within the scope of the invention, that is to say for producing a cultivation support, because it makes it possible to ensure that the final product has the necessary aeration, porosity, water retention and capillarity properties.

To obtain the required particle size distribution, the characteristics of the machine must be defined as a function of the nature of the lignocellulosic material employed. Slabs and trimmings of debarked wood, and preferably of resinous or deciduous sapwood with long fibers and a low tannin content will preferably be employed, these slabs and trimmings having been stored for at least one to two months before use and not having been treated with herbicides at the plantation.

By passing through the cutter, chips are produced, with dimensions of the order of $4 \, cm \times 4 \, cm \times 0.5 \, cm$ in which the dry content should be of the order of 0.5 to 0.6 at most.

If the dry content is higher than 0.6, it is preferable to moisten the chips or to stove them slightly with steam.

The screws will be driven at a speed of 250 to 350 revolutions/minute, which gives a time of travel in the machine of only a few seconds.

The following table gives an example of particle size distribution obtained by employing the Bauer Mac Nett classification:

| Screen (mesh)       | 14   | 28   | 48  | 100 | 200 | fines |
|---------------------|------|------|-----|-----|-----|-------|
| Percentage retained | 61.4 | 11.7 | 9.2 | 5.9 | 3.5 | 8.3   |

But passing the chips through the screw machine does not allow merely their grinding to be carried out.

First of all, as indicated, it is possible to control the temperature of the material conveyed in the flights. The first grinding will preferably be carried out on chips whose temperature will have been raised to a level of the order of 120° C. by means of heating jackets covering the downstream part of the first entrainment zone A and, if appropriate, the beginning of the first hold-up zone B. This temperature level makes it possible to ensure the sterilization of the material, particularly useful in the case of use in out-of-soil cultivation. However, the temperature must remain below 140° C. to avoid the production of acetic acid.

Furthermore, this temperature increase promotes of the fractionation and of the compression of the chips and which can be removed, with some of the water, through filtering zones (15) provided in the wall of the barrel (11) slightly upstream of the hold-up zone B.

On leaving this zone, the material is decompressed in the wide direct pitch zone C, where it mixes with a binder introduced through the orifices (16) and preferably consisting of a polymerizable adhesive, for example a mixture of a urea-formaldehyde resin with an aqueous solution of urea and $NH_4Cl$ as resin catalyst. The introduction of the adhesive through the orifices (16) takes place by injection under pressure at a rate regulated as a function of that of the material conveyed by the screws, it being possible for the quantity of injected adhesive to be of the order of ten per cent (10%) of the dry weight of chips which is treated.

By virtue of the particular grinding process performed between the screws, especially in the reverse-pitch zone D, it is possible, by judiciously adjusting the rate of injection of the binder, to obtain a noncontinuous distribution of the latter between the fibers, while avoiding the latter being coated with a continuous film. A joining-up of fibers in separate spots is thus produced, and this presents no risk of affecting the porosity of the product or the water-retention properties of the fibers.

It is also possible to introduce, through orifice (16) or other orifices, liquid or solid additives intended to be distributed in the mixture such as, for example, a wetting product making it possible to improve the immediate retention of water and/or of the microorganisms liable to be associated with the fibers and promoting plant growth.

Mixing of the binder with the fibers is completed at the exit of the second hold-up zone D and the last entrainment zone E makes it possible to expel through the outlet orifice (14) a product having a dry content of between 0.45 and 0.55 and a dry density of 40 to 45 kg per $m^3$.

Moreover, curing of the adhesive is delayed until the outlet of the machine by virtue of the cooling jackets (27) which make it possible to reduce and to maintain the temperature of the material after the injection zone C at a level below approximately 85° C., the mixture leaving the machine at a temperature of the order of 75° to 80° C.

It will be noted that the expulsion of the mixture through the orifice (14) takes place normally quite easily by virtue of the mutual scraping effect in the meshing zone of the screws which are driven in the same direction.

The product thus obtained at the outlet of the machine could be merely packaged in batches capable of being employed as they are. However, it is much more advantageous to incorporate the screw grinding machine just described in a more complete plant shown diagrammatically in FIGS. 3 and 4 and in which the screw machine (1) constitutes the first part.

In fact, the product expelled through the outlet orifice (14) falls into a hopper (41) opening into a duct (42) carrying a stream of gas generated by a fan (43). The duct (42) which conveys the gas mixture and the ground product opens tangentially into a cyclone (4) equipped with a discharge stack (44) and a lower outlet orifice (45).

The product (31) which leaves the machine and falls into the duct (42) disintegrates in the gas stream and reaches the cyclone (4) in the form of suspended fibers of various sizes. The gas escapes through the stack (44) with approximately ten per cent (10%) of the water which was still present in the product, and the fibers accumulate at the base of the cyclone (4) and are discharged through the lower orifice (45).

This aeration of the product has allowed its temperature to be reduced further to a level of approximately 45° C. Consequently, the polymerization of the adhesive has not yet taken place.

The fiber mixture leaving through the orifice (45) can therefore assume the shape which it is intended to be given and is directed for this purpose to a distribution and shaping plant (5).

FIG. 4 shows, by way of example, a plant (5) of this kind, comprising a vibrating table (51) which channels the mixture (32) leaving the cyclone (4) towards a shaping table (52) provided with lengthwise walls between which a shaped bar having the required width is formed. The table (52) is advantageously used in combination with a compression device (53) which enables the beam (33) to be given the required density and thickness.

It will be noted that the particular constitution of the material (33) leaving the screw machine and comprising more or less isolated fibers (34), agglomerated bundles of fibers (35) and filaments (36) of various sizes, promotes the whole process of aeration, distribution and shaping of the product which, by virtue of its entangled texture shown diagrammatically in FIG. 5, can be packed in the three dimensions to adopt the required shape and thickness, these dimensions remaining subsequently substantially constant, especially after the binder has set.

Until this time, in fact, the temperature of the mixture (31, 32, 33) had been maintained at a level which is too low to allow the binder to cure, and this has made it possible to shape the product. After the required dimensions have been obtained, the temperature will therefore be raised to a level above 100° C., making it possible to ensure the polymerization of the binder. The latter cures and a product is obtained, whose texture has been shown diagrammatically, on an enlarged scale, in FIG. 5, and consisting of fibers (36) of various lengths and particle sizes, linked together randomly by points of adhesive at intervals (37). This results in a relatively rigid and yet aerated structure which is particularly favourable to the support and development of roots and allows liquids and air to circulate.

This temperature rise is produced by passing the beam (33) through a drying oven (54) operating, for example, by circulation of pulsed hot air and/or by microwaves, and in which the temperature is raised to a level of the order of 120° to 130° C. to ensure the polymerization of the binder. This also results in the removal of some water and, at the exit of the oven, a product (6) is obtained, containing from five to ten per cent (5 to 10%) of residual moisture and having an apparent density of 80 kg per m$^3$+20%.

The shaped product (6) cools on leaving the oven (54) and is finally sectioned by a cutting device (55) into blocks or "loaves" (7) of specified length.

These loaves (7), which are relatively rigid, can then be packaged and wrapped according to need.

In a particularly advantageous embodiment, the loaves (7), which may, for example, have a length of 1 meter, a width of 20 centimeters and a thickness of 8 centimeters, are placed in a jacket consisting of a sheet of plastic material of the type employed for cultivation and retaining liquids.

Such a jacket must be preferably opaque, insensitive to ultraviolet and of alimentary grade.

Products which are ready for use can thus be produced, the plastic jacket making it possible to contain a nutrient liquid in the loaf of entangled fibers used as a support for the roots.

Thus, while hitherto the known cultivation supports were mainly produced in bulk and intended essentially to be mixed with a natural soil, the invention, on the other hand, makes it possible to introduce onto the market rigid products of specified dimensions and already jacketed with a leakproof film. Such products offer the advantage of great ease of handling and of use. Since they are light and easy to transport, they can be laid and arranged anywhere, holes can be provided for planting, for example, cuttings therein, and the nutrient liquid can then be simply introduced into the jacket Furthermore, by virtue of the degree of rigidity obtained by adhesively bonding the entangled fibers at points, there is no risk of natural packing of the support, which retains its porosity properties in the course of time.

Throughout the manufacture it has been possible to control accurately both the particle size distribution of the fibers and their moisture content, and the sterilization carried out during the manufacture enables a biologically inert product to be obtained.

The control of the physicochemical characteristics of the product makes it possible to guarantee the retention of the required properties with time and, especially, pH, retention ranges, drainage capacities and wettability.

Another major advantage of this new out-of-soil support is its organic and biodegradable nature, which permits its use for numerous crops without any difficulties.

At the end of cultivation, the support can be introduced into mixtures of the compost type to improve soils or it can be burnt.

Furthermore, the addition of urea, and hence of nitrogen, to the binder together with, if appropriate, other adjuvants employed as catalyst or otherwise, acts as a delayed-action fertilizer and is therefore beneficial for plant growth.

Naturally, the invention is not limited strictly to the details of the embodiment just described and also covers the alternative forms remaining within the scope of protection defined in the claims.

In particular, the screw grinding machine has been described in its simplest form for obtaining the required result, but it would not be forbidden to employ some of its potential to perform, for example, other treatments on the wood chips. Furthermore, the various means of drying, of distribution and of shaping the ground material could be replaced by equivalent devices In particular, drying of the material leaving the grinding machine could be performed, for example, on a filter table and the shaping of the product could be carried out in individual moulds.

I claim:

1. A process for making a composite product obtained by grinding wood chips or other lignocellulosic raw material, comprising the steps of:
    passing the material through a machine, said machine comprising at least two screws driven in rotation inside a barrel which encloses them and provided with flights of various pitches;
    regulating the conveying characteristics of said material so as to produce a controlled degree of grinding to obtain, at the outlet of the machine, a mixture based on isolated fibers and agglomerated bundles of fibers of various lengths and particle sizes;
    introducing an adhesive binder into the barrel during the grinding at a rate regulated as a function of the conveying conditions of the material so that the adhesive is distributed in the mixture of fibers; and
    delaying curing of the adhesive binder by controlling the temperature of the material so that curing takes place only after leaving the machine.

2. The process according to claim 1, wherein the grinding conditions are regulated so as to obtain a mixture of fibers whose lengths can range from a few microns to approximately one centimeter.

3. The process according to claim 2, wherein the mixture obtained includes isolated fibers, fiber agglomerates and filaments whose particle size distribution is such that at least 60% of the mixture is retained on a 14 mesh screen and that the proportion of fines passing through the 200 mesh screen is less than 10%.

4. The process according to claim 1, wherein at least in the first part of the screw grinding machine, a progressive compression with trituration and fractionation of the chips is performed, wherein at least a part of the resin and of the water which are bound to the chips is removed by filtering means arranged in the barrel to reach a dry content of between 0.45 and 0.55.

5. The process according to claim 4, wherein in the first stage of progressive compression, a sterilization of the chips is carried out by raising the temperature to a level between 120° C. and 140° C.

6. The process according to claim 1, wherein, before the introduction of the adhesive binder, the temperature of the mixture is decreased to a level which does not permit the binder to cure, said temperature being maintained at least as far as the outlet of the grinding machine.

7. The process according to claim 1, wherein at least one liquid or solid additive is introduced into the barrel during the grinding.

8. The process according to claim 1, wherein after leaving the grinding machine, the mixture is cooled and dried to a temperature below 50° C. and a dry content no greater than 0.6 is obtained.

9. The process according to claim 1, wherein the mixture leaving the grinding machine is shaped, by molding and/or profiling, into a product of specified dimensions and density and the temperature of the mixture is then raised to a level above 100° C. so as to fix the said dimensions by curing the adhesive.

10. The process according to claim 9, wherein the mixture is shaped into a beam continuously and is then divided into loaves of specified lengths.

11. The process according to claim 3, wherein in the first stage of compression a sterilization of the chips is carried out by raising the temperature to a level between 120° C. and 140° C.

12. The process according to claim 5, wherein before the introduction of the adhesive binder, the temperature of the mixture is decreased to a level which does not permit the binder to cure, said temperature being maintained at least as far as the outlet of the grinding machine.

13. The process according to claim 7, wherein said additive includes at least one of a wetting product or microorganisms which promote plant growth.

14. The process according to claim 1, wherein the adhesive is distributed noncontinuously in the mixture of fibers.

* * * * *